United States Patent Office 3,689,455
Patented Sept. 5, 1972

3,689,455
PREPARATION OF SILOXY-CARBORANYL POLYMERS
Dwain R. Chapman, Midland, Mich., assignor to Dow Corning Corporation, Midland, Mich.
No Drawing. Filed May 1, 1969, Ser. No. 821,145
Int. Cl. C08g 33/18
U.S. Cl. 260—46.5 E          1 Claim

ABSTRACT OF THE DISCLOSURE

Siloxy-carboranyl polymers are prepared by condensation of bis(hydroxysilyl)neocarboranes, bis(alkoxysilyl)neocarboranes or siloxanyl derivatives thereof in the presence of tetrafluoroethanesulfonic acid. The polymers obtained by this process are thermally stable fluids and elastomers.

---

This invention relates to a method of polymerizing siloxy-carboranyl compounds.

A variety of siloxy-carboranyl polymers are known in the art. Examples of such polymers are shown in U.S. Pats. 3,388,090; 3,388,091; 3,388,092; and 3,388,093. These polymers, containing the $\{Si-CB_{10}H_{10}C-SiO\}$ units, are attractive for use in high temperature environments because of their thermal and oxidative stability. These polymers have been prepared by condensation of bis(alkoxy-dialkylsilyl)neocarboranes with bis(halodialkylsilyl)neocarboranes in the presence of ferric chloride. To date the ferric chloride catalyzed reaction is the only method available for the production of the siloxy-carboranyl polymers. It has been determined that this ferric chloride method is ineffective when the silicon atom contains a fluoroalkyl substituent.

In the process of the present invention, polymers containing both boron and silicon are prepared by condensation of bis(silyl)neocarboranes of the formula $$R'O-\underset{R}{\underset{|}{Si}}-\left(\underset{R}{\underset{|}{\overset{R}{\underset{|}{Si}}}}O\right)_n-CB_{10}H_{10}C-\left(\underset{R}{\underset{|}{\overset{R}{\underset{|}{Si}}}}O\right)_m-\underset{R}{\underset{|}{\overset{R}{Si}}}O-R'$$

in which R is independently selected from the group consisting of alkyl radicals of from 1 to 12 carbon atoms inclusive, β-perfluoroalkylethyl radicals of from 3 to 12 carbon atoms, or aryl radicals of not more than 8 carbon atoms; R' is independently selected from the group consisting of the hydrogen atom or alkyl radicals containing from 1 to 6 inclusive carbon atoms; n is an integer having a value of from 0 to 2 inclusive, and m is an integer having a value of from 0 to 2 inclusive; in the presence of an acid catalyst selected from the group consisting of sulfuric acid, and sulfonic acid derivatives including methanesulfonic, ethanesulfonic, p-toluenesulfonic, perfluoromethanesulfonic and tetrafluoroethanesulfonic acids.

The neocarboranes utilized as starting materials in the process of the invention are known compounds. They are generally prepared by reaction of neocarborane and butyl lithium to form dilithioneocarborane which in turn is reacted with a halosilane or dihalodisiloxane of the formula

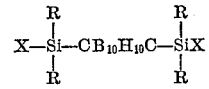

to form bis(halosilyl)neocarboranes. The bis-halo compounds are readily hydrolyzed in water-acetone solutions to form diols or the bis-halo compounds can be reacted with an excess of the appropriate alcohol to obtain the bis(alkoxysilyl)neocarborane reactants.

The starting materials can also be synthesized by reacting dilithioneocarborane with a cyclic trisiloxane to form a mixture of lithium-endblocked monomers which can then be hydrolyzed. This method is illustrated in the examples.

Included with the group of reactants are bis(silyl)-neocarboranes, of the formula $$X-\underset{R}{\underset{|}{\overset{R}{Si}}}-CB_{10}H_{10}C-\underset{R}{\underset{|}{\overset{R}{Si}}}X$$

for example,
bis(methoxydimethylsilyl)neocarborane,
bis(methoxypropylmethylsilyl)neocarboranes,
bis(ethoxydi-n-propylsilyl)-neocarboranes,
bis(isobutoxydi-isopropylsilyl)neocarboranes,
bis(hydroxymethylethylsilyl)neocarboranes,
bis(hydroxydioctylsilyl)neocarboranes,
bis(hydroxyphenylmethylsilyl)neocarboranes,
bis(hydroxydiphenylsilyl)neocarboranes,
bis(hydroxydidodecylsilyl)neocarboranes,
bis(propoxymethyltolylsilyl)neocarboranes,
bis(hydroxyethylxylylsilyl)neocarboranes,
bis(hydroxy-perfluoropropylethyl-pentylsilyl)neocarboranes, and
bis(tetraorganodisiloxanyl)neocarboranes;

of the formula $$X-\underset{R}{\underset{|}{\overset{R}{Si}}}-O\underset{R}{\underset{|}{\overset{R}{Si}}}-CB_{10}H_{10}C-\underset{R}{\underset{|}{\overset{R}{Si}}}O-\underset{R}{\underset{|}{\overset{R}{Si}}}X$$

for example,
bis(1,1,3,3-tetramethyl-3-methoxydisiloxanyl)neocarborane,
bis(1,1-dimethyl-3,3-diphenyl-3-hydroxydisiloxanyl)neocarborane,
bis(1,1,3,3-tetrapropyl-3-ethoxydisiloxanyl)neocarborane,
bis(1-perfluoromethylethyl-1,3,3-trimethyl-3-hydroxydisiloxanyl)neocarborane,
bis(1,1,3-trisopropyl-3-hexyl-3-butoxydisiloxanyl)neocarborane,
bis(1,1,3-trioctyl-3-xylyl-3-hydroxydisiloxanyl)neocarborane, and
bis(1,3-diperfluorooctylethyl-1,3-ethyl-3-hydroxydisiloxanyl)neocarborane.

These compounds are intended as illustrative but not limiting of the defined reactants. The compounds can be intercondensed, that is with one of the same species to form homopolymers, or they can be co-condensed with one another to form copolymers of the different siloxy-carboranyl units. The polymeric products of the process are of the general formula

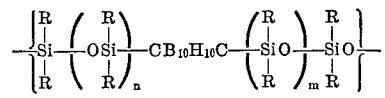

in which R, n and m are as previously described. Those polymers containing a perfluoroalkylethyl substituent on the silicon atom are described in copending application Ser. No. 821,105, filed concurrently herewith, the disclosure of which is incorporated herein by reference.

The temperature at which the condensation is carried out can be varied from 100° C. to about 250° C. Preferably, the reaction is carried out at from 150 to 200° C. The reaction time can be varied widely depending upon the degree of polymerization desired in the product. Generally after one hour at temperature, there is a substantial increase in viscosity of the reaction mixture. At temperatures of about 200° C., an elastomeric solid is obtained after 20 hours.

In contrast to the ferric chloride catalyzed reaction, the process of the invention does not present any problems of catalyst removal after condensation is complete. It is not necessary to remove the catalyst but if desired, the acid catalyst can be volatilized by heating under a high vacuum. Generally heating to 250+° C./0.2 mm. Hg is sufficient to remove any detrimental amounts of sulfonic acid catalyst.

The following examples are illustrative of the invention which is delineated in the claims.

EXAMPLE 1

A few crystals of tetrafluoroethanesulfonic acid were mixed with 12.4 grams of bis(hydroxydimethylsilyl)-neocarborane and heated at 110° C. for 15 hours. The product of this diol condensation was a solid elastomeric polymer melting in the range of from 228° C. to 236° C.

EXAMPLE 2

Twenty grams of bis(1,1,3,3 - tetramethyl - 3 - chlorodisiloxanyl)neocarborane was hydrolyzed in a mixture of 250 milliliters of ether in 500 milliliters of water. The hydrolyzate was washed neutral, dried and stripped of solvent. A small amount (about 0.1 gram) of tetrafluoroethanesulfonic acid was added to the hydrolyzate, bis(1,1,3,3 - tetramethyl - 3 - hydroxydisiloxanyl)neocarborane and the mixture was stirred for 15 minutes at 110° C. A few (5–8) drops of methylvinyldichlorosilane were then added and heating was continued at 100° C. for another hour, the last half hour being under aspirator vacuum. The condensation product was heated to 150° C. to remove any volatiles. The polymer was a light tan color and had high elasticity.

EXAMPLE 3

A five gram portion of bis(hydroxy-trifluoromethylethylmethylsilyl)neocarborane and 2–4 drops of sulfuric acid were heated for approximately 20 hours at 175–200° C./15 mm. Hg. The polymer product,

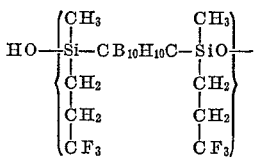

H, was a light amber hard solid which had some elastic properties. The polymer had a number average molecular weight ($M_n$) of 817 and a weight average molecular weight ($M_w$) of 7,560 as determined by gel permeation chromatography.

A second five gram portion of the above bis(hydroxysilyl)neocarborane was condensed by the addition of 0.1 gram of tetrafluoroethanesulfonic acid and heating for 30 hours at 150–200° C. This polymer was a light amber semi-elastic solid. This product was milled with a small amount of methyltriacetoxysilane and cured at 200° C. The cured product was a resinous film which exhibited a swell of only 18 volume percent in methylisobutyl ketone.

A third reaction in which 18.2 grams of the above bis-(hydroxysilyl)neocarborane and 0.11 gram of trifluoropropylvinyldichlorosilane were mixed with the tetrafluoroethanesulfonic acid catalyst and heated for 24 hours at 110° C. gave copolymer which was a waxy solid having a melting point of 72–74° C.

EXAMPLE 4

A five gram portion of the bis(1,3 - dimethyl - 1,3 - diperfluoromethylethyl - 3 - hydroxydisiloxanyl)neocarborane was condensed in the presence of tetrafluoroethanesulfonic acid by heating for 24 hours at 200° C. The resulting polymer,

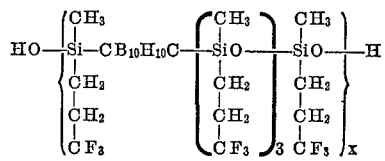

was a very viscous, clear polymer.

EXAMPLE 5

A dilithioneocarborane slurry was made starting with 29 grams (0.2 mole) of m-carborane. To the slurry was added 62 grams (0.1 mole) of 1,3,5 - tris(3,3,3-trifluoropropyl) - 1,3,5 - trimethylcyclotrisiloxane dissolved in 100 milliliters of ether. The mixture was stirred for two days and then 105 grams (0.5 mole) of (3,3,3-trifluoropropyl)methyldichlorosilane was added at room temperature over a 30 minute period. The mixture was then filtered and distilled. A number of compounds were isolated having the general structure $$Cl(SiP_fMeO)_nSiP_fMeCB_{10}H_{10}CP_fMeSi(OP_fMeSi)_mCl$$

where $n=0$, $m=1$ (19%); $n=1$, $m=1$ (27%); $n=2$, $m=1$ (9%).

G.l.p.c. comparison analysis with known compounds also indicated the presence of compounds having the same general structure,

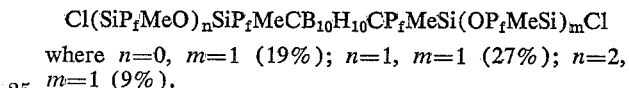

where $n=0$, $m=0$ (9%) and where $n=2$, $m=2$ (5%), in the intermediate fractions and residues. The above yields are approximations based on g.l.p.c. analysis. The overall yield was 70%. The structure, distilled yield (97% pure) and properties of the compounds isolated are listed below.

$n=1$, $m=0$; (16%):
 boiling point 150–155°/0.3 mm. Hg. The structure was confirmed by $H_1$ N.M.R. Chlorine analysis was 10.48% (theory 10.91%).

$n=1$, $m=1$; (16%):
 boiling point 160–166°/0.3 mm. Hg. The structure was confirmed by infrared and $H^1$ N.M.R. analysis. Chlorine analysis was 7.607 (theory 8.79%).

$n=1$, $m=2$; (8.5%):
 boiling point 128°/0.1 mm. Hg. The structure was confirmed by infrared and $H^1$ N.M.R. spectroscopy. Chlorine analysis was 7.607 (theory 8.79%).

A 20 gram (0.025 mole), portion of

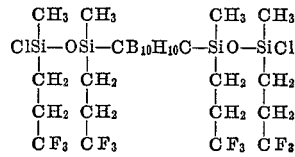

prepared as described above was dissolved in 25 milliliters of acetone. To this was added 18 grams (1.0 mole) of water in 25 milliliters of acetone. After stirring, water and ether were added and the organic layer was washed with water until neutral. The water was removed and benzene was added and the mixture refluxed to remove the last traces of water. Evaporation of the solvents under reduced pressure left a residue product of 14.5 grams (76% yield) of the bis(hydroxydisiloxanyl)neocarborane, which was then condensed in the presence of tetrafluoroethanesulfonic acid to obtain a polymer.

EXAMPLE 6

A C,C'-dilithiocarborane ether slurry was made by utilizing 195 grams of m-carborane. This slurry was added to 312 grams of 3,3,3-trifluoropropylmethylsiloxane cyclic trimer which was dissolved in 150 milliliters of ether. After stirring for several hours, 360 grams (1 mole percent) of 3,3,3 - trifluoropropylmethyldichlorosilane were added to the reacted mixture. The material was then filtered and hydrolyzed in water. The hydrolyzate was stripped at 225° C./0.3 mm. Hg to remove impurities and volatile material. The hydrolyzate was partially condensed during the stripping operation to give a prepolymer having the general structure:

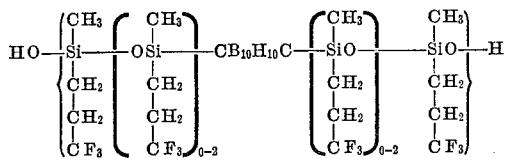

A portion of the prepolymer was mixed with a small amount of methyltriacetoxysilane and cured to an elastomer.

When a condensation catalyst, such as sulfonic acid, is added to the prepolymer and the mixture is further heated a high molcular weight polymer of the various carborane-siloxy units is obtained.

EXAMPLE 7

A prepolymer was prepared by adding an ether slurry of C,C'-dilithioneocarborane (made from 42 grams of neocarborane) to 178 grams of trifluoropropylmethylchlorodisiloxane in 100 milliliters of ether. After stirring for several hours, the reaction mixture was filtered and the volatiles were removed by stripping to pot temperature of greater than 200° C./0.1 mm. Hg. The residue was hydrolyzed in water, washed neutral, dried and stripped to a pot temperature of 250° C./0.2 mm. Hg to obtain a prepolymer of the structure:

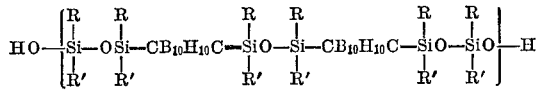

This prepolymer was condensed in the presence of tetrafluoroethanesulfonic acid to obtain a fluid polymer having a viscosity of over 200,000 cps. at 25° C.

That which is claimed is:
1. A method of preparing siloxy-carboranyl polymers comprising heating neocarboranes of the formula

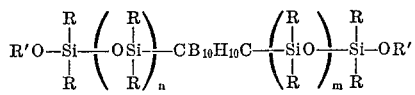

in which

R is independently selected from the group consisting of alkyl radicals of from 1 to 12 inclusive carbon atoms, β-perfluoroalkylethyl radicals of from 3 to 12 inclusive carbon atoms, and aryl radicals of not more than 12 carbon atoms;

R' is independently selected from the group consisting of the hydrogen atom and alkyl radicals containing from 1 to 6 inclusive carbon atoms;

$n$ is an integer having a value of from 0 to 2 inclusive and $m$ is an integer having a value of from 0 to 2 inclusive; in the presence of tetrafluoroethanesulfonic acid as a catalyst, the heating being to a temperature in the range of from 100 to 250° C.

References Cited

UNITED STATES PATENTS 3,354,193　11/1967　Fein _____ 260—448.2
3,457,222　7/1969　Papetti _____ 260—46.5

DONALD E. CZAJA, Primary Examiner

M. I. MARQUIS, Assistant Examiner

U.S. Cl. X.R.

260—46.5 G, 448.2 N, 448.8 R, 606.5 B